United States Patent [19]
Drocco et al.

[11] Patent Number: 5,549,136
[45] Date of Patent: Aug. 27, 1996

[54] METERING VALVE FOR AUTOMATIC FLUID METERING DEVICES, PARTICULARLY FOR INDUSTRIAL INK AND PAINT

[75] Inventors: Luca Drocco, Alba; Mario Drocco, Grinzane Cavour, both of Italy

[73] Assignee: Dromont Meccanica S.r.l., Grinzane Cavour, Italy

[21] Appl. No.: 304,550

[22] Filed: Sep. 12, 1994

[30] Foreign Application Priority Data

Sep. 13, 1993 [IT] Italy ................. TO93A0666

[51] Int. Cl.⁶ .................................. F16K 11/04
[52] U.S. Cl. .................... 137/872; 137/871; 251/120
[58] Field of Search .................. 137/872, 871, 137/883; 251/120

[56] References Cited

U.S. PATENT DOCUMENTS

| | | | |
|---|---|---|---|
| 2,169,043 | 8/1939 | Goehring | 137/872 X |
| 2,916,061 | 12/1959 | Hahn et al. | 137/871 X |
| 2,933,285 | 4/1960 | Tucker | 137/872 X |
| 3,180,360 | 4/1965 | Pavlin et al. | 137/625.5 |
| 3,327,992 | 6/1967 | Billeter et al. | 251/120 X |
| 3,426,798 | 2/1969 | Chernak | 251/120 X |
| 4,846,226 | 7/1989 | Merritt | 137/871 |

FOREIGN PATENT DOCUMENTS

| | | |
|---|---|---|
| 0283137 | 9/1988 | European Pat. Off. . |
| 882423 | 6/1943 | France . |

OTHER PUBLICATIONS

International Publication WO 88/06690 published Sep. 7, 1988.

Primary Examiner—John C. Fox
Attorney, Agent, or Firm—Nikaido, Marmelstein, Murray & Oram LLP

[57] ABSTRACT

A metering valve wherein an outer casing defines a first and second chamber communicating with each other via a hole and respectively communicating externally of the casing via a fluid inlet conduit and a fluid recirculating conduit. The first chamber also communicates externally via a supply conduit, and houses a shutter movable axially inside the chamber between a first position wherein a first portion of the shutter closes the aforementioned hole, and a second position wherein a second portion of the shutter closes the supply conduit. For any intermediate position between the first and second positions, the total area of the gaps between the supply conduit and the second portion and between the hole and the first portion is notably constant, so that, for any position of the shutter, the total section of the fluid passage of the metering valve is constant.

8 Claims, 4 Drawing Sheets

5,549,136

METERING VALVE FOR AUTOMATIC FLUID METERING DEVICES, PARTICULARLY FOR INDUSTRIAL INK AND PAINT

BACKGROUND OF THE INVENTION

The present invention relates to a metering valve for automatic fluid metering devices, particularly for industrial ink and paint.

Automatic fluid metering devices are known wherein a supporting structure presents a number of metering valves, each presenting a delivery way, a recirculating way, and a supply nozzle.

Each valve is movable in relation to the supporting structure between a first idle position wherein the nozzle is closed and all the incoming fluid is recirculated, and an operating position wherein the valve is connected to a regulating device for so opening the valve as to feed part of the incoming fluid out through the nozzle.

Gradual opening of the valve results in a variation in the total section of the fluid passage and hence in the hydraulic resistance of the valve, so that any variation in the supply pressure of the valve results in a sharp variation in supply by the nozzle even with no change in the section of the fluid passage.

Moreover, gradual opening of the valve results in a sharp variation in pressure inside the valve itself.

SUMMARY OF THE INVENTION

It is an object of the present invention to provide a valve for automatic fluid metering devices, designed to overcome the drawbacks typically associated with known valves.

According to the present invention, there is provided a valve as described in Claim 1.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Number 1 in FIG. 1a–1d indicates an automatic fluid metering device, particularly for industrial ink and paint.

Device 1 comprises a modular metal supporting structure 4 composed of a central structure 7 and at least one peripheral structure 10 fitted to central structure 7. More specifically, in FIG. 1a, 1b, 1c and 1d, central structure 7 is shown connected respectively to one, two, three and four peripheral structures 10.

Figure 1A:
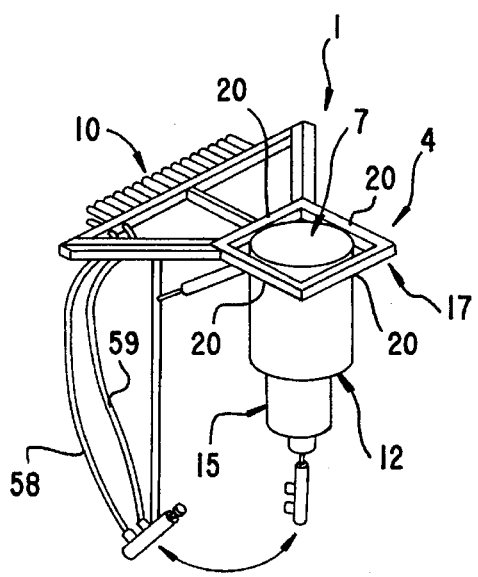
FIG. 1a shows an automatic fluid metering device featuring a metering valve in accordance with the teachings of the present invention.
Figure 1B:
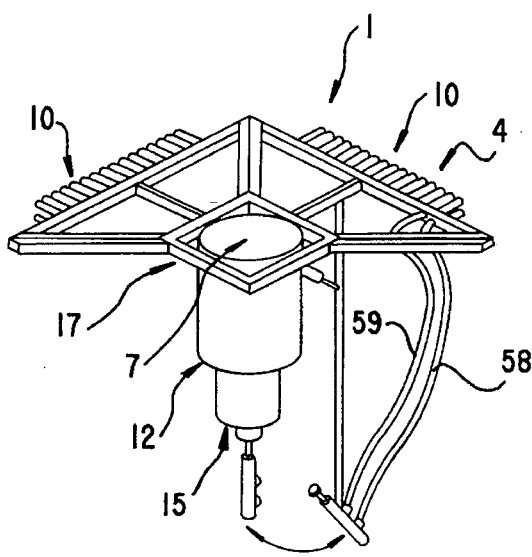
FIG. 1b shows an automatic fluid metering device in a second operating configuration.
Figure 1C:
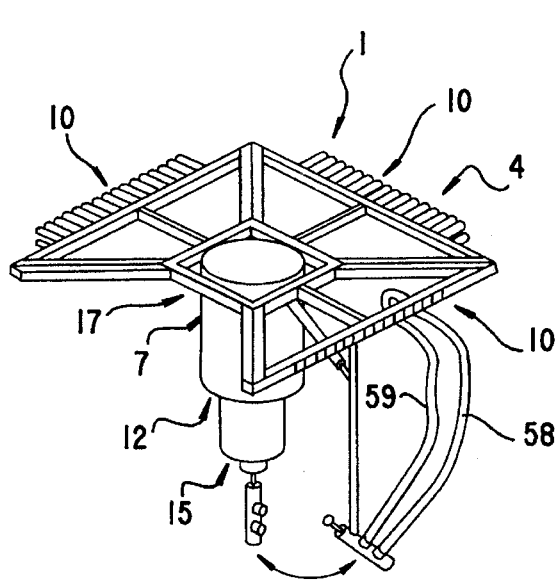
FIG. 1c shows an automatic fluid metering device in a third operating configuration.
Figure 1D:
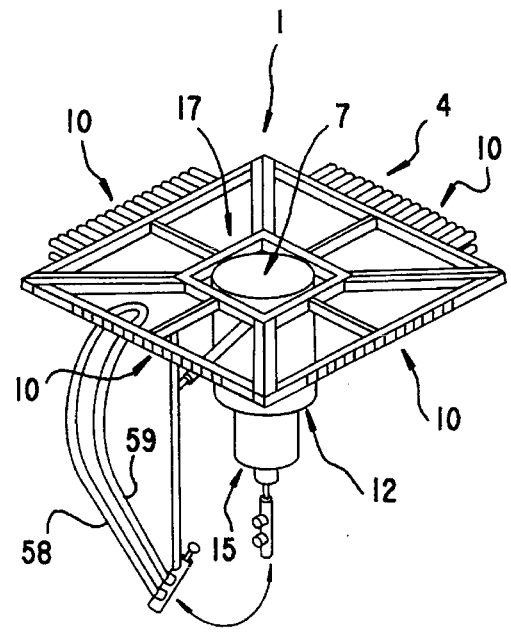
FIG. 1d shows an automatic fluid metering device in a fourth operating configuration.

With reference to FIG. 1a, central structure 7 comprises a vertical cylindrical tubular structure 12 fitted underneath with a known valve regulating device 15, and supporting a square frame structure 17 fitted to the top end portion of structure 12.

More specifically, frame structure 17 is composed of four flat elongated plates 20 tangent to tubular structure 12 and fitted to it by means of connecting appendixes 21 (not shown).

Each plate 20 is defined by a flat rectangular surface 25 facing outwards of central structure 7.

Each peripheral structure 10 comprises a frame 28 in the form of an isosceles trapezium and composed of two straight beams 30, 31 parallel to each other and respectively defining the shorter and longer sides of the trapezium, and two straight beams 33, 34 extending transversely in relation to beams 30, 31.

Figure 3:
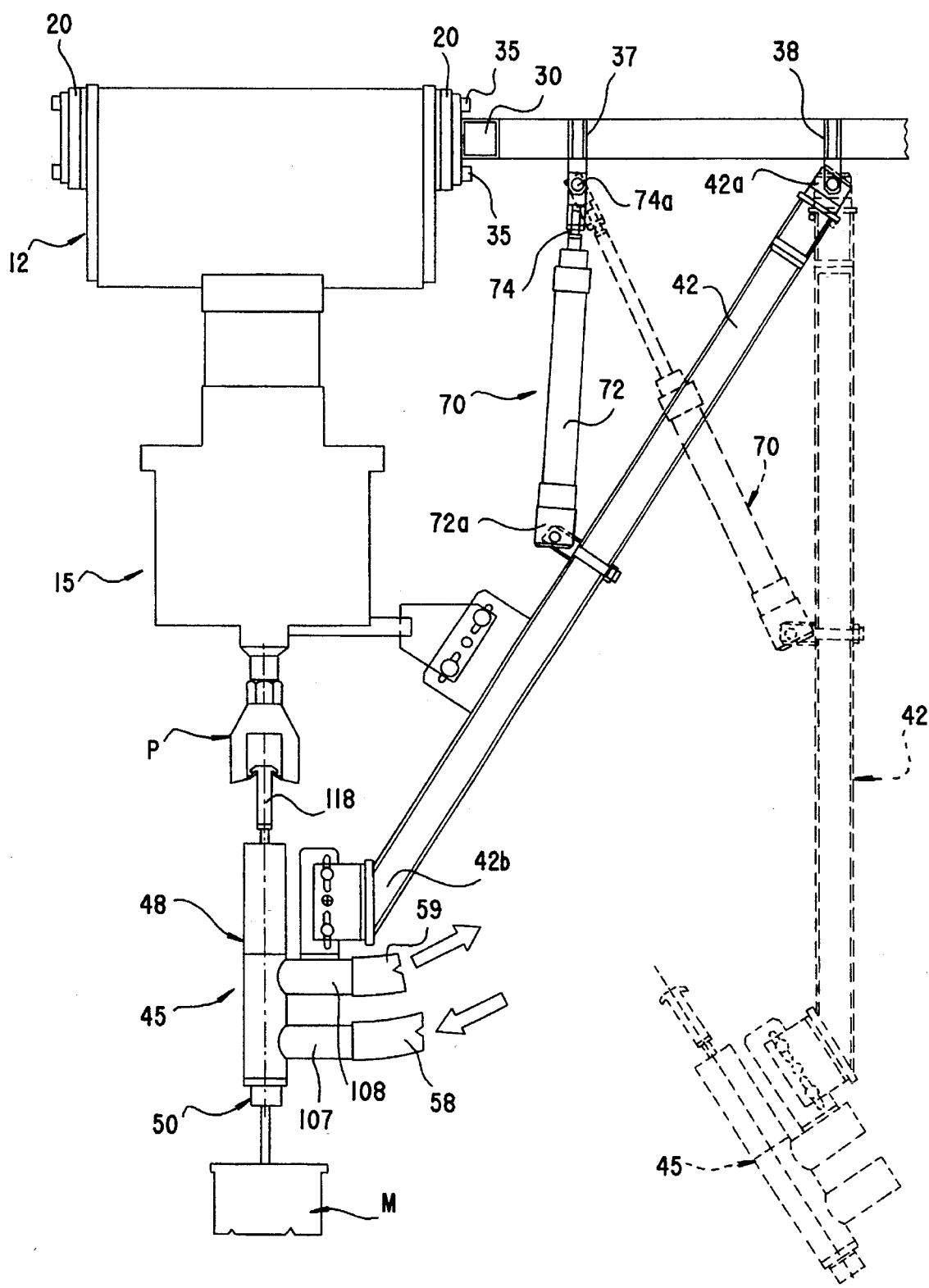
FIG. 3 shows a partial side view of the FIG. 2 device.

The shorter-side beam 30 is substantially the same length as plate 20 of central structure 7, and is fitted to plate 20 by known connecting means, e.g. bolts 35 (FIG. 3), with one face (not shown) contacting surface 25 of plate 20.

As such, central structure 7 may be fitted with one, two, three or four peripheral structures to form the various operating configurations shown in FIGS. 1a–1d.

Figure 2:
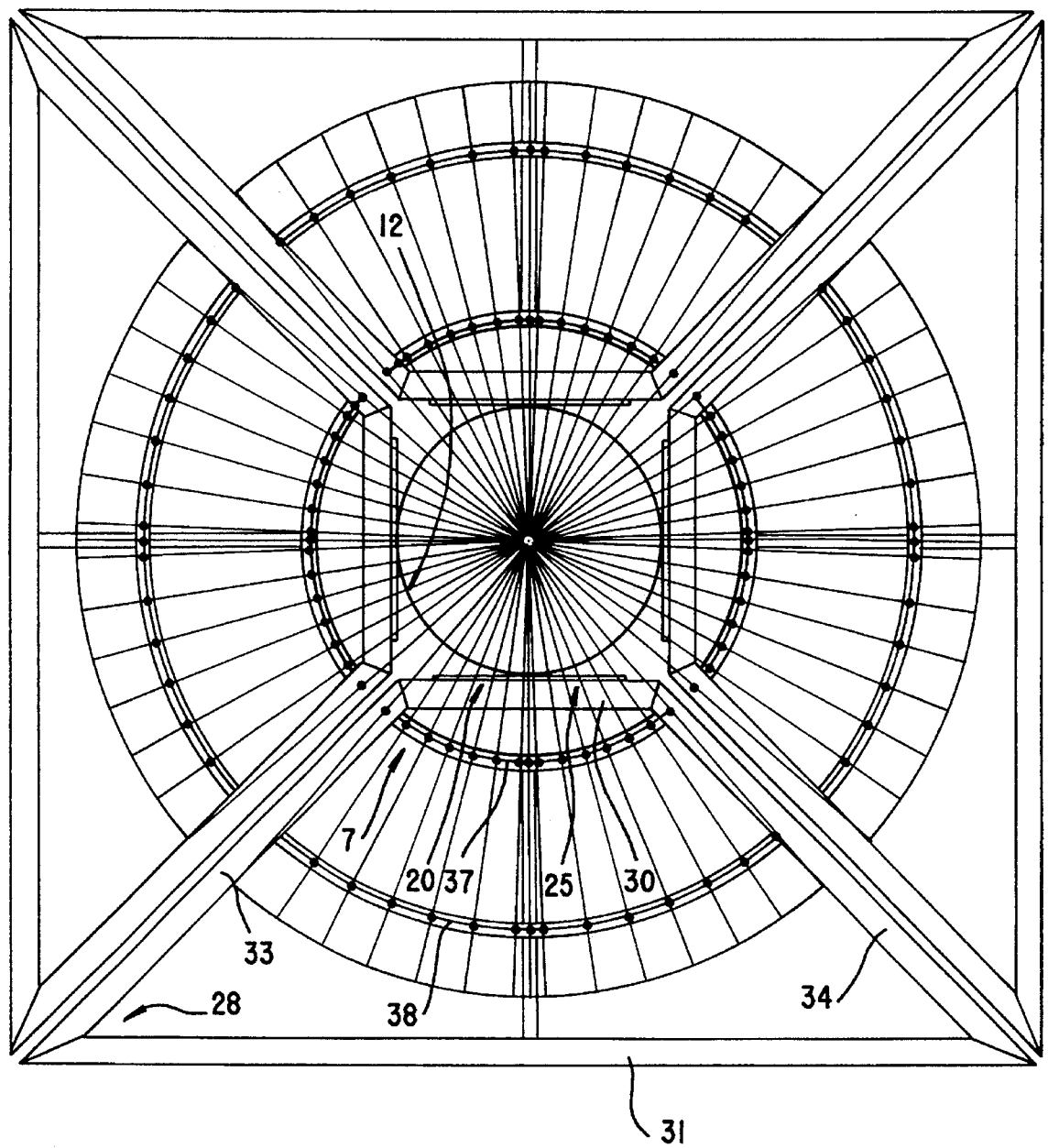
FIG. 2 shows a top plan view of the device in FIG. 1a–1d.

With reference to FIG. 2, each peripheral structure 10 also comprises a first arc-shaped beam 37 extending between oblique beams 33, 34 close to shorter-side beam 30; and a second arc-shaped beam 38 extending between central portions of oblique beams 33, 34 and equally spaced radially in relation to beam 37.

Beam 38 of each peripheral structure 10 supports sixteen straight arms 42 (FIG. 3) extending downwards from hinges equally spaced angularly along beam 38.

More specifically, each arm 42 presents a top end 42a hinged to beam 38, and a bottom end 42b fitted with a respective metering valve 45.

Each metering valve 45 (described in more detail later on) comprises a cylindrical outer casing 48 inclined in relation to arm 42 and presenting a supply nozzle 50 extending axially from the free end of casing 48.

Each arm 42 is connected to a pneumatic actuator 70 extending between a central portion of arm 42 and arc-shaped beam 37. More specifically, each pneumatic actuator 70 comprises an elongated outer casing 72 with one end 72a hinged to arm 42; and a movable straight member 74 extending axially from casing 72 and presenting an end portion 74a hinged to arc-shaped beam 37.

Each arm 42 is moved by respective actuator 70 between a first idle position (shown by the dotted line in FIG. 3) wherein arm 42 is substantially vertical; and an operating position wherein arm 42 is inclined in relation to the horizontal, and metering valve 45 is located beneath tubular structure 12 and connected to regulating device 15.

The automatic fluid metering device also presents an electronic control unit (not shown) for controlling valve regulating device 15 and actuators 70.

Figure 4:
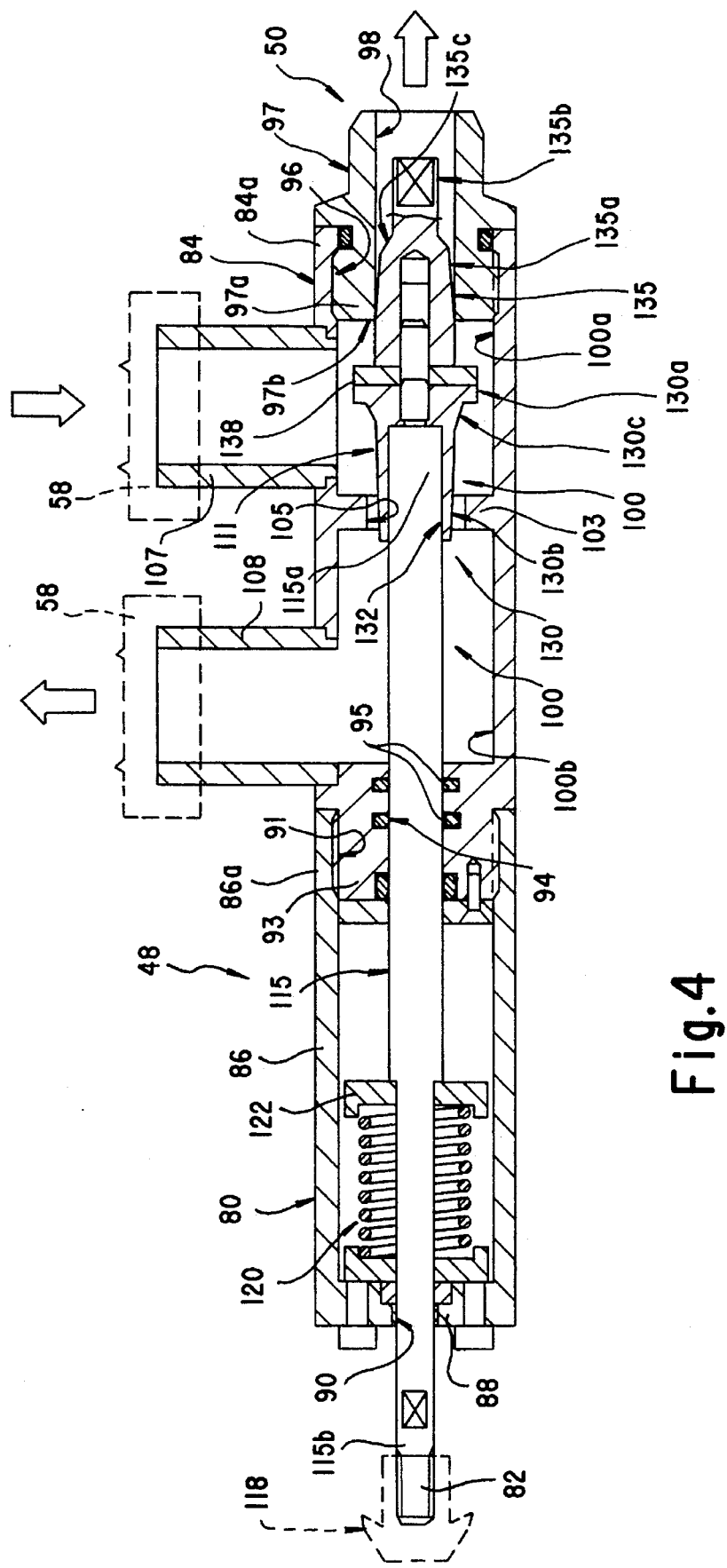
FIG. 4 shows a section of a metering valve in accordance with the teachings of the present invention.

FIG. 4 shows a detailed view of metering valve 45.

Outer casing 48 of valve 45 comprises a first cylindrical tubular body 80 coaxial with axis 82; and a second cylindrical tubular body 84 coaxial with axis 82 and connected to one end of tubular body 80. Both the first and second bodies 80, 84 are made entirely of stainless steel, e.g. AISI 316.

First tubular body 80 comprises a cylindrical wall 86 coaxial with axis 82; and an end wall 88 perpendicular to axis 82 and presenting a central through hole 90 coaxial with axis 82.

Cylindrical wall 86 presents an end portion 86a which defines an opening 91 housing a threaded cylindrical appendix 93 extending axially from a first end portion of tubular body 84. Appendix 93 presents a through hole 94 coaxial with axis 82 and presenting a number of annular grooves housing sealing rings 95.

Body 84 presents a second end portion 84a which defines an opening 96 fitted inside with a threaded cylindrical portion 97a of a tubular body 97 projecting axially from body 84 to form nozzle 50.

More specifically, tubular body 97 defines a cylindrical conduit 98 coaxial with axis 82 and extending between the annular end wall 97b of body 97 and the end edge of nozzle 50.

Second body 84 thus defines a cylindrical inner cavity 100 communicating externally of metering valve 45 via conduit 98.

Tubular body 84 also presents an inner partition wall 103 extending perpendicularly to axis 82 inside cavity 100, presenting a central through hole 105 coaxial with axis 82, and which thus divides cavity 100 into a first chamber 100a adjacent to nozzle 50, and a second chamber 100b communicating with chamber 100a through hole 105.

Casing 48 also presents two conduits 107, 108 extending radially from tubular body 84 and terminating respectively inside chambers 100a and 100b.

Conduits 107, 108 respectively define the fluid inlet and recirculating fluid outlet of metering valve 45.

Metering valve 45 also comprises a shutter 111 housed inside chamber 100a and fitted to a first end portion 115a of a cylindrical stem 115 coaxial with axis 82, extending in fluidtight manner through holes 94 and 90, and engaging hole 105 (which is larger in diameter than stem 115).

Stem 115 also presents a second end portion 115b projecting from tubular body 80 and presenting a connecting knob 118, the function of which is described later on.

Stem 115 is also connected to a coil spring 120 housed inside tubular body 80 and extending between end wall 88 and a disk body 122 fitted to and axially fixed in relation to stem 115. Spring 120 provides for pushing shutter 111 towards nozzle 50 and so closing the nozzle.

Shutter 111 comprises a first substantially truncated-cone-shaped body 130 with a cylindrical axial cavity 132 housing end portion 115a of stem 115; and a second substantially truncated-cone-shaped body 135 opposite and coaxial with body 130.

First and second bodies 130, 135 are separated by a spacer disk 138 made of plastic material, in particular Teflon, and the function of which will be described later on.

First body 130 presents a circular base portion 130a adjacent to Teflon disk 138; and a portion 130b tapering towards end 115b of stem 115; which portions 130a, 130b are connected by an annular bevel 130c with a greater taper ratio than portion 130b.

Second body 135 comprises a substantially truncated-cone-shaped portion 135a flaring towards end 115a; and a cylindrical end body 135b integral with truncated-cone-shaped portion 135a; which portions 135a, 135b are connected by an annular bevel 135c with a greater taper ratio than portion 135a.

The fluid inlet and outlet conduits 107, 108 of each metering valve 45 of device 1 are also connected to the first ends of supply and recirculating hoses 58, 59, the second ends of which are connected respectively to the outlet of a pump (not shown) supplying pressurized fluid (conveniently paint or ink), and to a tank supplying the pump.

In actual use, the electronic unit (not shown) operates a first actuator so as to move a first metering valve from the idle to the operating position wherein knob 118 engages valve regulating device 15 for opening valve 45.

Valve 45 operates and is opened/closed as follows.

In the idle position, no pressure is exerted on stem 115; second body 135 of the shutter is housed inside conduit 98; Teflon disk 138 is pressed by spring 120 against annular wall 97b of tubular body 97; nozzle 50 is fully closed; and all the fluid fed into chamber 100a flows into chamber 100b through hole 105.

Valve regulating device 15 presents a movable member P (FIG. 3) which engages and moves knob 118 axially in the opposite direction to the action of spring 120 and by a given distance determined by the electronic unit (not shown), so that body 135 of shutter 111 withdraws from conduit 98; the trapezoidal surface of first body 130 moves towards hole 105; conduit 98 opens gradually to permit fluid supply by nozzle 50; and the gap between first body 130 and hole 105 narrows so as to reduce the amount of fluid fed from first chamber 100a to second chamber 100b.

The fluid from nozzle 50 is collected in a mixing vessel M (FIG. 3) underneath the nozzle.

Stem 115 is arrested upon bevel 130c of body 130 contacting partition wall 103, in which position chamber 100b is completely separated from chamber 100a, and all the fluid fed into chamber 100a is fed out through nozzle 50.

At any point between the closed and open positions, the total area of the gaps between conduit 98 and second body 135 and between hole 105 and first body 130 is notably constant.

Consequently, at any point between the closed and open positions of the shutter, the total section of the fluid passage of metering valve 45 is constant; the sum of the fluid supplied by nozzle 50 and the recirculated fluid is constant and equal to the fluid supplied to the valve; and the surplus fluid is therefore recirculated with no change in pressure inside the valve.

After a given time determined by the electronic unit, knob 118 is released; shutter 111 rapidly closes nozzle 50 by virtue of spring 120; valve 45 is restored by pneumatic actuator 70 to the idle position; and the operations described above are repeated for another valve for feeding a different fluid (e.g. different coloured paint or ink) into mixing vessel M.

The advantages of the metering valve according to the present invention are as follows.

In particular, the total section of the fluid passage of the valve is constant and independent of the position of shutter 111, so that the hydraulic resistance of valve 45 is constant and outflow not noticeably affected by any change in supply pressure.

Moreover, as the valve gradually opens, the pressure inside the valve remains unchanged.

When the metering device is closed, all the fluid fed to the metering valve is recirculated, so that the valve may be supplied with large quantities of fluid for flushing and removing any material adhering to the walls of chambers 100a, 100b.

Being made entirely of stainless steel, the metering valve is noncorrodable and capable of withstanding severe operating pressure (as high as 10 bar).

The modular design of metering device 1 provides for a high degree of flexibility for adapting to various requirements.

Device 1 in fact may be provided with sixteen, thirty-two, forty-eight or sixty-four metering valves by fitting central structure 7 with one, two, three or four peripheral structures 10; and, even when installed and operative, may be modified by simply adding on one or more peripheral structures 10.

Clearly, changes may be made to the metering valve and device as described and illustrated herein without, however, departing from the scope of the present invention.

We claim:

1. A metering valve automatic metering of industrial fluids, comprising:

an outer casing having at least one chamber therein, said outer casing including a first fluid output port and a second fluid output port thereupon;

fluid supply means for supplying fluid to said at least one chamber;

recirculating outlet means for recirculating said fluid, with fluid to be recirculated passing through the second fluid output port in said at least one chamber;

shutter means for selectively opening and closing said first and second fluid output ports in said at least one chamber, said shutter means being axially movable along an axis of said at least one chamber between a first position wherein said shutter means seals said second fluid output port, and a second position wherein said shutter means seals said first fluid output port, wherein said shutter means is configured such that the shutter means is movable to any intermediate position between said first and second positions, and wherein a total area of openings which are created between said shutter and said first fluid output port and said shutter and said second fluid output port is constant, and wherein an internal pressure of said metering valve remains constant, and wherein said shutter means includes a first sealing portion for sealing said second fluid output port, and a second sealing portion for sealing said first output port, wherein said first and second sealing portions are truncated cone shaped sections, having cone shaped portions thereof extend in opposite directions along an axis of said shutter means, and wherein said shutter means includes a sealing disc, said sealing disc being disposed between said first sealing portion and said second sealing portion.

2. A metering valve as recited in claim 1, wherein said first sealing portion includes a circular base adjacent to said sealing disc, said first sealing portion also including a tapered section extending axially from said circular base, said circular base portion and said tapered section being connected by an annular bevel section, said annular bevel section having a degree of taper which is higher than a degree of taper of said tapered section.

3. A metering valve as recited in claim 1, wherein said second sealing portion includes a cone-shaped portion, an annular bevel, and a cylindrical portion, said annular bevel being connected between said cylindrical portion and said cone-shaped portion, said annular bevel having a higher degree of taper than the cone-shaped portion, and wherein said cone-shaped portion is connected to the sealing disc.

4. A metering valve as claimed in claim 1, wherein the metering valve is applied to an automatic fluid metering device for industrial ink and paint, said automatic metering valve comprising:

a supporting structure (4); and a number of said metering valves (45), each presenting at least one inlet supplied by a respective pressurized fluid source, and a fluid recirculating outlet;

each said metering valve (45) also presenting an adjustably opened supply conduit;

and each metering valve (45) being fitted to a respective movable member (42) by which it is moved between a first idle position and an operating position wherein the metering valve (45) engages regulating means (15) for opening said supply conduit by a predetermined amount.

5. A metering valve as claimed in claim 4, wherein said supporting structure is modular and comprises at least a central structure (7) with a number of peripheral connecting portions (20);

said supporting structure also comprising at least one peripheral structure (10) supporting a predetermined number of said metering valves (45) and said movable members (42);

each peripheral structure (10) presenting a lateral portion (30) fitted stably to a respective peripheral connecting portion (20) of said central structure (7).

6. A metering valve as claimed in claim 5, wherein said peripheral structure (10) comprises a supporting frame structure (28).

7. A metering valve as claimed in claim 6, wherein said peripheral structure comprises a trapezoidal supporting frame (28);

the shorter-side portion (30) of said trapezoidal frame being fitted to a said peripheral portion (20) of said central structure (7).

8. A metering valve as claimed in claim 4, wherein viewed from above, said central structure (7) is quadrangular.

* * * * *